Oct. 4, 1955            R. C. STEELE            2,719,807

CELLULAR CORE PRODUCT AND METHOD OF MAKING SAME

Filed July 21, 1954            4 Sheets-Sheet 1

INVENTOR.
ROGER C. STEELE
BY
Townsend and Townsend
ATTORNEYS

Oct. 4, 1955 — R. C. STEELE — 2,719,807
CELLULAR CORE PRODUCT AND METHOD OF MAKING SAME
Filed July 21, 1954 — 4 Sheets-Sheet 2

INVENTOR.
ROGER C. STEELE
BY Townsend and Townsend
ATTORNEYS

Oct. 4, 1955 — R. C. STEELE — 2,719,807
CELLULAR CORE PRODUCT AND METHOD OF MAKING SAME
Filed July 21, 1954 — 4 Sheets-Sheet 3

INVENTOR.
ROGER C. STEELE
BY
Townsend, Townsend and Hoppe
ATTORNEYS

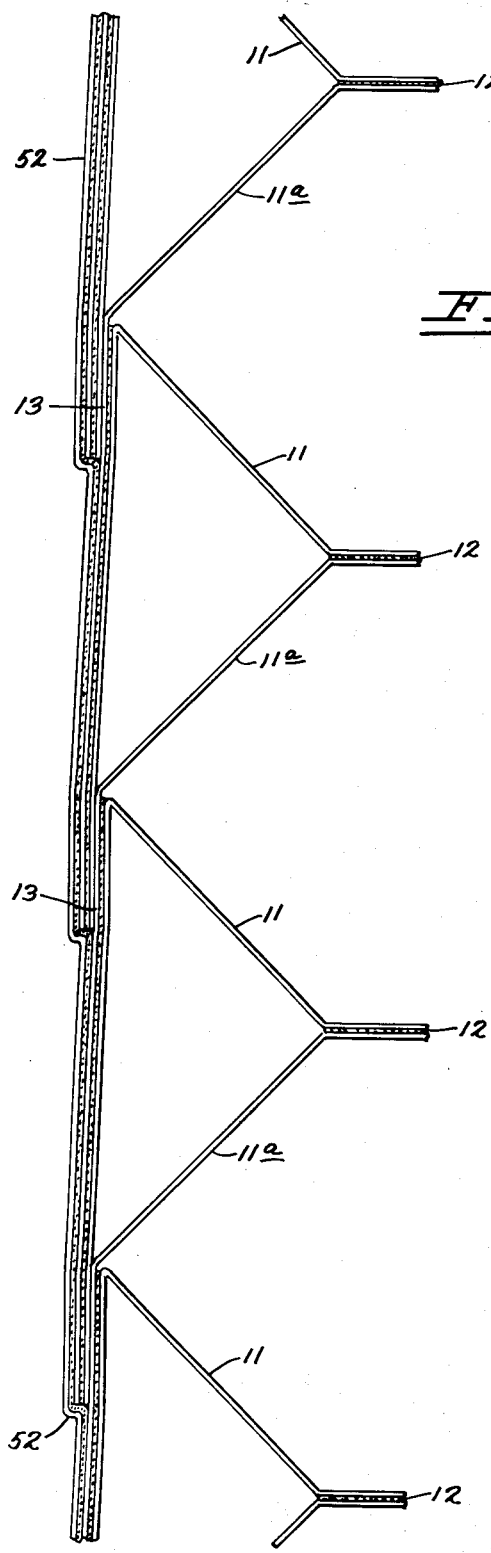

United States Patent Office 2,719,807
Patented Oct. 4, 1955

2,719,807

CELLULAR CORE PRODUCT AND METHOD OF MAKING SAME

Roger C. Steele, Oakland, Calif., assignor to California Reinforced Plastics Company, Oakland, Calif., a corporation of California Application July 21, 1954, Serial No. 444,683

8 Claims. (Cl. 154—117)

This invention relates to a new cellular core product and method of making the same and is a continuation in part of my copending application, Serial No. 282,391, filed April 15, 1952, now abandoned. The explanation of the invention which hereinafter follows is confined for purposes of convenient illustration and example to the fabrication of that type of cellular core material known in the trade as honeycomb. However, the invention is applicable in the fabrication of cellular products other than honeycomb having certain characteristics hereinafter explained.

The product which is illustrated in the drawings and which will be described hereinafter in greater detail, comprises, generally, a sheet of expansible honeycomb core of the type characterized as comprising a plurality of individual corrugated strips extending in a common direction and which are bonded together at their adjacent nodes defining substantially hexagonal shape cell openings. The nature of honeycomb is such that the opposite end portions of the individual strips project outwardly to opposite sides of the sheet defining, in effect, projecting tabs or ears. In one embodiment of the invention shown, these projecting ears are folded back over themselves and bonded to one another by adhesive applied directly to the ears in overlapping, shingle-like arrangement defining comparatively rigid, continuous, and smooth marginal side edges of the sheet. In a second embodiment of the invention shown, the projecting ears are bonded in overlapping shingle-like arrangement by continuous strips of adhesive coated or gummed tape applied along opposite side edges of the honeycomb material.

A principal object of the present invention is to provide a honeycomb, or generally similar cellular core product, having comparatively rigid, continuous, and smooth side marginal edges. One principal advantage of such a construction is that there are established marginal edges which present relatively large bonding surfaces or areas to which other component elements, such as other similarly fabricated sheets of the cellular material, may be securely bonded.

Another principal object and advantage of a construction of the type briefly mentioned above, is that the overlapped bonded ears or tabs defining the comparatively rigid opposite side edges function to substantially permanently fix and set both the expanded length and width of the cellular sheet.

Another principal object of the invention is to teach a method of fabricating a product of the type hereinabove referred to.

Other objects and advantages of the present invention will become apparent upon reading the following specification and referring to the accompanying drawings in which similar characters of reference represent corresponding parts in each of the several views.

In the drawings:

Fig. 6 is a fragmentary plan view of the second embodiment of the honeycomb product.

Figure 1:
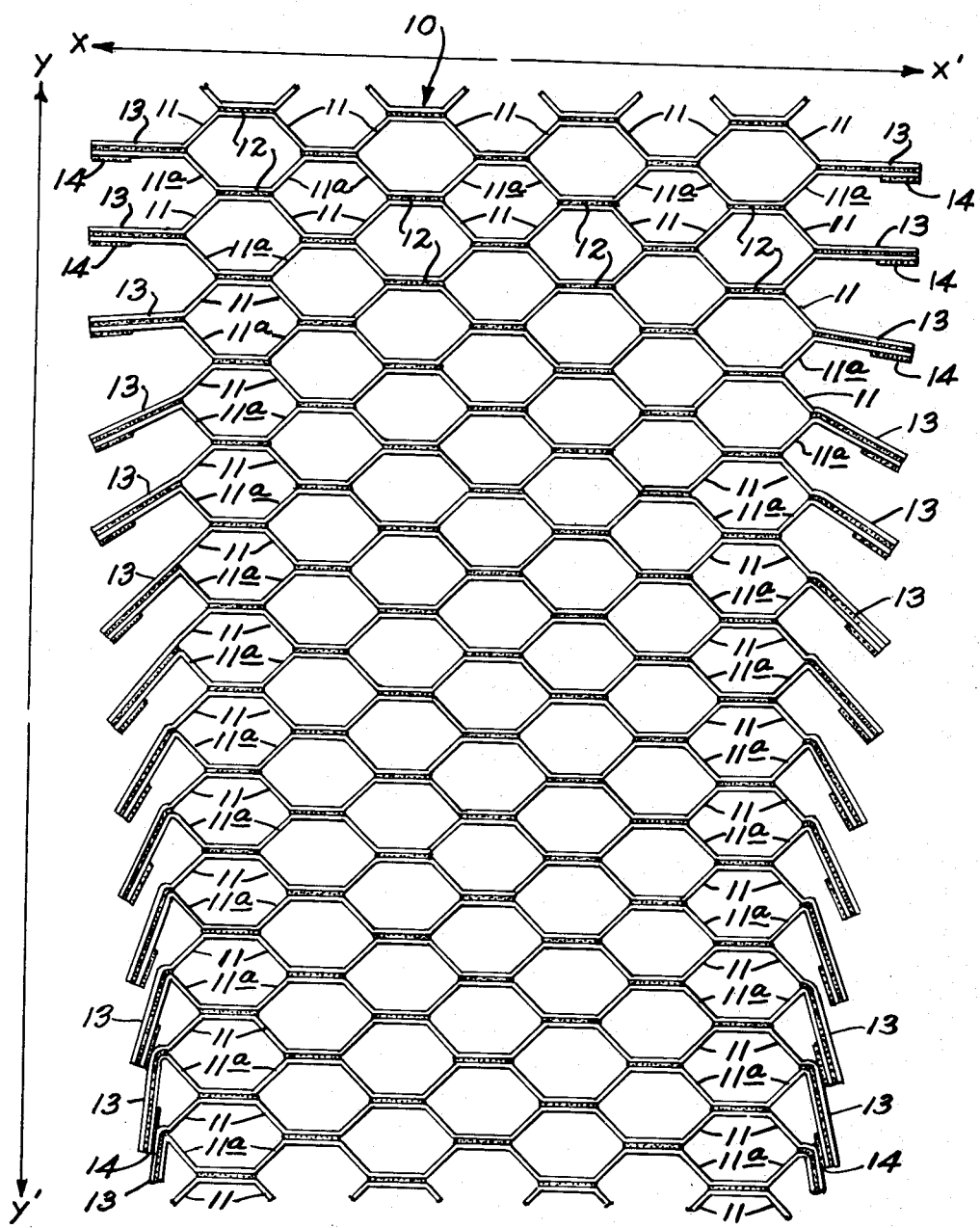
Fig. 1 is a plan view of a sheet of cellular honeycomb material showing various portions and areas thereof in different stages of fabrication according to a first method of manufacture and showing the thicknesses of the cell defining webs and adhesive lines of said sheet disproportionately enlarged for purposes of clarity of illustration.

Honeycomb core may be formed from a variety of materials, the choice of material usually being dependent upon both economic factors and upon the use to which the honeycomb is to be put. For example, honeycomb may be made out of such materials as paper, metal-foil, cloth, or glass cloth. When the honeycomb is made of cloth or glass cloth, it is considered a practical necessity to impregnate the material with a suitable binding or stiffening agent, such as a thermosetting or thermoplastic synthetic resin, in order to provide sufficient rigidity and strength to the material. When the honeycomb is made of medium to heavy grade kraft paper, the same can be impregnated with a suitable resin, or not, depending on the use to which the product is to be put. Generally speaking, metal-foil honeycomb, being inherently non-absorbant, is not impregnated or coated with synthetic resins. The present invention has utility and application to any one of these aforementioned kinds of honeycomb in addition to other types of cellular material having certain characteristics hereinafter designated.

For purposes of convenient illustration and example, it may be assumed that the sheet of expanded honeycomb, illustrated in the drawings and indicated generally at 10, is formed of medium grade kraft paper. The method and manner of producing the sheet 10, of itself, is not considered as a part of the present invention, although a sheet of the type and kind illustrated may be satisfactorily and efficiently produced in accordance with the method and by the apparatus described in my prior United States Letters Patent No. 2,610,934, dated September 16, 1952.

The sheet 10 comprises essentially a plurality of individual corrugated strips or webs, alternately designated 11 and 11ª, which extend in a common direction. Adjacent corrugated strips are bonded to one another, node-to-node, at spaced points throughout their lengths by suitable lines of adhesive, such as indicated at 12. For convenient reference, the axis of the sheet which corresponds to the common direction in which strips 11 and 11ª extend is designated, and will hereafter be referred to as axis x—x'; and the axis of the material normal to the direction in which the strips 11 and 11ª extend is designated, and will hereafter be referred to as axis y—y'.

Opposite end portions of strips 11 and 11ª are shown in the upper portion of Figure 1 as projecting outwardly in the direction of axis x—x' to opposite sides of the sheet of honeycomb defining projecting ears or tabs 13.

The present invention, in one of its aspects, involves the folding back and bonding together of adjacent ears in overlapping, shingle-like arrangement, such as shown in the lower portions of Figure 1. More specifically, a quantity of suitable adhesive, such as indicated at 14, may be applied in any suitable manner to at least one side of each tab 13. Thereupon, the tabs are folded back over themselves into bonded, overlapping, shingle-like arrangement defining comparatively straight-line, continuous, smooth and rigid marginal side edges of the honeycomb sheet.

The particular type or kind of adhesives which may be employed to effect the bonding together of the overlapped tabs 13 is not, of itself, considered as a part of the present invention, as the selection and choice of adhesive will largely depend on the nature and type of cellular core material employed, the nature of the use to which the material is ultimately to be put, and on economic considerations. As examples, however, mixtures or blends of synthetic resins, such as urea adhesives and resorcinal adhesives, have been found to be very satisfactory in bonding paper, cloth, and glass cloth honeycomb, whereas mixtures or blends of synthetic resins, such as epoxy resin or modified phenolic resins, have been found particularly satisfactory in the bonding of metal-foil honeycomb, such as aluminum foil honeycomb. It is evident that the amount of heat and pressure, if any, that should be applied against the folded-over tabs to insure and secure a permanent bond is dependent on the kind of particular adhesive employed—these being known or readily determinable factors and within the ordinary skill of the art.

It is pointed out that for purposes of a better and more clear illustration and example of the structural features of the invention, Fig. 1 shows the thicknesses of adhesive lines 12 and 14 and of strips 11 and 11ª as being disproportionately enlarged.

Figure 2:
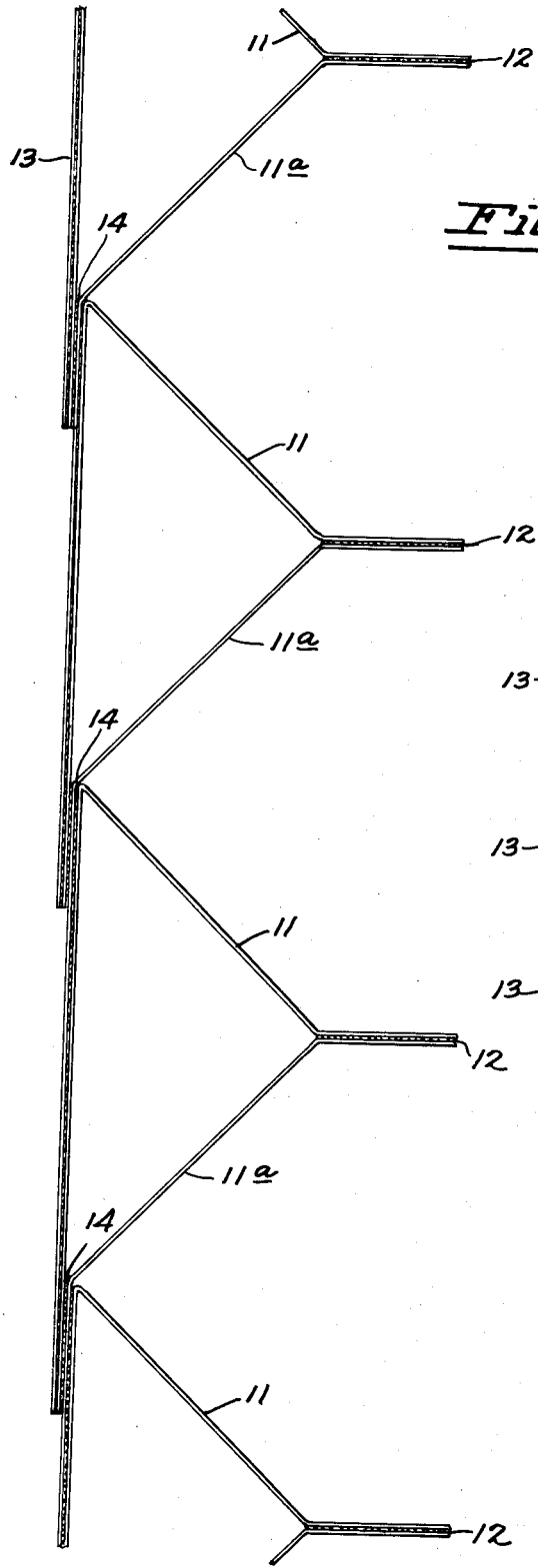
Fig. 2 is an enlarged fragmentary plan view more nearly to scale of a section of a sheet of honeycomb fabricated in accordance with the said first method of manufacture.
Figure 3:
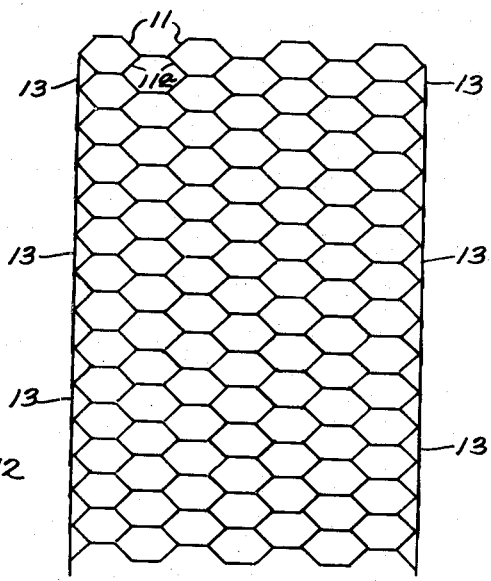
Fig. 3 is a fragmentary plan view of a sheet of honeycomb material fabricated in accordance with the invention with thicknesses of the cell defining webs and bonding lines of said sheet shown in single lines to more nearly conform to scale.

On the other hand, Fig. 2 is an enlarged plan view of a fragment of a honeycomb sheet fabricated in accordance with the present invention, and in which the relative thicknesses of the individual paper webs and bonding lines are drawn more nearly to scale. It is seen that in Fig. 2 the overlapped and bonded tabs 13 define a much smoother continuous marginal edge for the sheet than shown in Fig. 1 where the thicknesses of the paper material and bonding lines are shown in exaggerated proportions as aforesaid. Similarly, Fig. 3 is drawn more nearly to scale and in proportions and size more nearly resembling an actual sheet of the material, and again it is noted that the marginal edge defined by the overlapped tabs appears as a substantially smooth, regular, and continuous surface.

Because the overlapped bonded tabs or cars establish, as aforesaid, comparatively stiff or rigid continuous side edges for the honeycomb sheet, these function to permanently substantially fix both the expanded length and width of the honeycomb sheet. In this connection, it is pointed out that different types of honeycomb vary both in their inherent tendency to expand or contract, as well as in their ability to be expanded or contracted under influence of external forces applied thereto. For example, unimpregnated paper honeycomb, or paper honeycomb which has been impregnated with relatively low resin content, or cloth or glass cloth honeycomb which has been impregnated with a comparatively low resin content, are very susceptible to expansion and/or contraction. As a result, it is frequently difficult to maintain the material in its desired adjusted length and width during fabrication processes, such as in lay-up work, or in applying face skins thereto. An inherent characteristic of any honeycomb sheet of the type referred to herein is that expansion thereof in the direction of its length (e. g., in the direction of axis y—y') will cause a contraction or reduction in its width (e. g., in the direction of axis x—x'), and vice versa. As a corollary, if the expanded length of a honeycomb sheet is permanently fixed therein, it will serve to effectively correspondingly fix the widthwise expansion of the sheet—thus, in the example shown, by fixing the expanded length in the sheet in the direction of axis y—y' by means of the overlapped bonded tabs 13, the widthwise expansion in the direction of axis x—x' will also be substantially permanently fixed for most practical purposes, as aforesaid.

It is further pointed out that the projecting marginal ears or tabs of a sheet of cellular material can be bonded in overlapped position by means other than hereinabove described. For example, the tabs may be bonded in overlapped arrangement by applying strips or lengths of gummed or pressure sensitive adhesive tape over the tabs.

Figure 4:
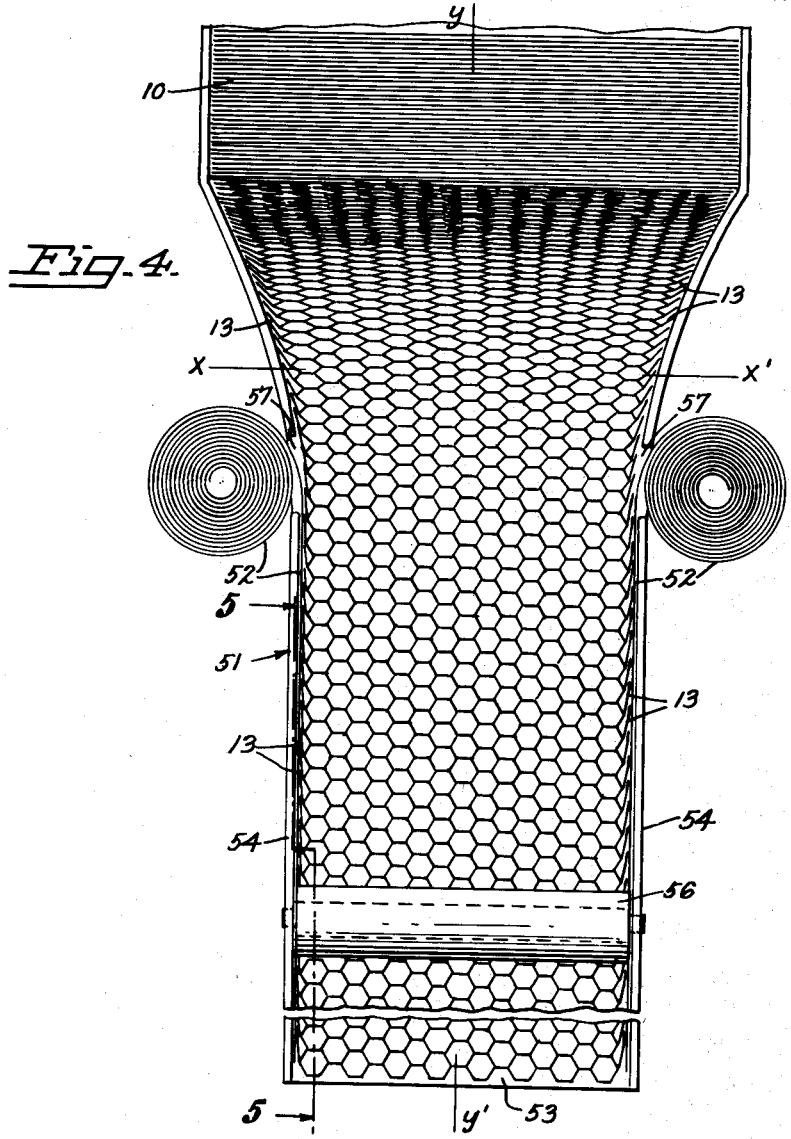
Fig. 4 is a schematic top plan view of a suitable type of equipment useful in practicing a second method of manufacturing a second embodiment of the honeycomb product.
Figure 5:
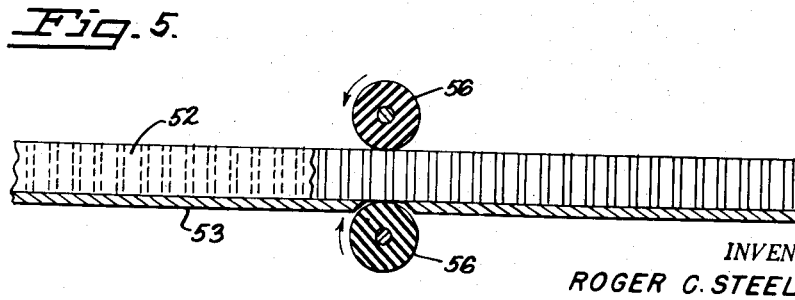
Fig. 5 is a fragmentary sectional view taken on line 5—5 of Fig. 4.

More specifically, Fig. 4 discloses how an unexpanded section of honeycomb 10 may be continuously expanded within a guideway structure, indicated generally at 51, and how, during the expansion process, continuous lengths of adhesive tape indicated at 52 can be applied to the folded back ears or tabs 13. In this connection, the guideway structure 51 may comprise a flat table surface 53 provided with upwardly extending side flanges or guideways 54. The guideways 54, in turn, may be formed and contoured so as to flare outwardly toward the end of the structure from which the unexpanded honeycomb section 10 is advanced for continuous expansion. As above explained, honeycomb is characterized by a tendency to narrow in the direction of its axis x—x' as it is expanded in the direction of its axis y—y'. Accordingly, the contour of the flanges 54 defining the flared entrance into the trough-like guideway 51 may be in proportion to the shape that the honeycomb section defines in expanding from its compacted condition to its fully expanded condition as illustrated in Fig. 4. The honeycomb may be continuously advanced through the guideway structure 51 manually or by any suitable mechanical means, such as friction feed rollers 56 which can be positioned to operate above and below the guideway (as shown in Fig. 5) so as to frictionally engage the top and bottom surfaces of the honeycomb advanced between said rollers.

As also shown in Fig. 4, continuous rolls or rings adhesive tape, such as conventional pressure sensitive or wet gum tape, can be fed through slots 57 formed through the guide flanges 54. It is observed that the shape and construction of the guide flanges 54 which are in continuous contact with opposite sides of the continuously advancing honeycomb section function to fold back the ears or tabs 13 during expansion of the material, and to maintain said tabs in folded back condition while the tape 52 is adhesively applied thereto.

It will be readily appreciated that the length of the guideway structure and the speed at which the honeycomb is advanced therethrough may be regulated with reference to the drying or curing time of the adhesive tape employed so that when the expanded honeycomb section arrives at the discharge end of the guideway 51, a secure bond between the tape and honeycomb will be insured whereby the expanded width and length of the expanded section will remain substantially fixed when it is removed from the end of the guideway.

Fig. 6 discloses fragmentarily a honeycomb section fabricated in accordance with the method described above with reference to Figs. 4 and 5. It is to be noted that the strips of taps 52 which function to bond the tabs 13 in overlapped arrangement provide smooth and continuous marginal edges for the expanded honeycomb section. It is appreciated, of course, that the method may be practiced manually or in conjunction with other types and kinds of equipment than that illustrated in Figs. 4 and 5.

From the foregoing, it is believed evident that the present invention is not restricted in its utility or application with respect to any one of several types of honeycomb or generally similar types of cellular core material. In short, the invention may be effectively and advantageously employed with respect to a sheet of any type of expanded or expansible cellular material formed of strips of material which present marginally extending ears or tabs which are sufficiently flexible to be bent back over themselves in overlapping shingle-like arrangement and firmly bonded to one another in such position to define one or more comparatively smooth, continuous, and rigid marginal edge or edges.

As also explained heretofore, another particular advantage in providing relatively smooth and continuous marginal edges for sheets of cellular material, is that a greatly enlarged edge-bonding area is established. In lay-up work where it is necessary to bond together a plurality of individual sheets into a unitary construction, it is usually of utmost importance that the bonds between the individual pieces be at least as strong as any single component piece comprising the construction. The enlarged edge-bonding areas which the present invention provides establishes a more than adequate means for fulfilling this requirement.

Although I have described my invention in some detail by way of illustration and example for purposes of clarity of understanding, it is understood that certain changes and modifications may be practiced within the spirit of the invention as limited only by the scope of the appended claims.

I claim:

1. A product comprising; a sheet of cellular core material formed of strips of sheet material bonded to one another at spaced points throughout their respective lengths defining cell openings, portions of said strips projecting outwardly to opposite sides of said sheet of cellular material defining projecting ears, adjacent ears being folded back over themselves and bonded in overlapping shingle-like arrangement defining substantially continuous and rigid opposite side edges of said sheet of cellular material.

2. A product comprising; a sheet of cellular honeycomb core material comprising a plurality of corrugated strips of sheet material, said strips extending in a common direction with the nodes of adjacent strips bonded together defining a plurality of substantially hexagonal shaped cells, opposite end portions of the strips defining laterally projecting ears, each ear formed with a substantially right angular bend normal to the said common direction in which the said strips extend, adjacent bent-over ears bonded to one another in overlapping shingle-like arrangement defining substantially continuous and rigid opposite side edges of the honeycomb sheet.

3. A method of fabricating a new product from a sheet of cellular core material of the type characterized as comprising a plurality of strips of relatively flexible sheet material bonded to one another at spaced points throughout their respective lengths defining enlarged cell openings, and with portions of said strips projecting laterally outwardly to opposite sides of said sheet of cellular material defining laterally projecting, relatively flexible ears, comprising the steps: folding adjacent projecting ears of said sheet of cellular core material back over themselves in overlapping shingle-like arrangement and adhesively securing said ears in said folded-back overlapping shingle-like arrangement.

4. A method of fabricating a new product from a sheet of honeycomb core material of the type characterized as comprising a plurality of corrugated strips of relatively flexible sheet material extending in a common direction with the nodes of adjacent strips bonded together defining substantially hexagonal shaped cells, and with the opposite end portions of the strips projecting outwardly to opposite sides of the sheet of honeycomb defining laterally projecting relatively flexible ears, comprising the steps: applying adhesive to at least one side of each projecting ear and folding adjacent ears back over themselves approximately perpendicularly to the common direction in which said strips extend with the adhesive surface of each ear overlapping an adjacent ear in shingle-like arrangement.

5. A product comprising; a sheet of cellular honeycomb core material comprising a plurality of corrugated strips of sheet material, said strips extending in a substantially common direction with the nodes of adjacent strips bonded together defining a plurality of substantially hexagonal shaped cells, opposite end portions of the strips defining laterally projecting ears, each ear formed with a substantially right angular bend normal to the said common direction in which the said strips extend, and continuous lengths of adhesive coated material adhesively applied to and bonding said bent-over ears thereby defining substantially continuous and rigid opposite side edges of the honeycomb sheet.

6. A method of fabricating a new product from a sheet of cellular core material of the type characterized as comprising a plurality of strips of relatively flexible sheet material bonded to one another at spaced points throughout their respective lengths defining enlarged cell openings, and with portions of said strips projecting laterally outwardly to opposite sides of said sheet of cellular material defining laterally projecting, relatively flexible ears, comprising the steps: folding adjacent projecting ears of said sheet of cellular core material back over themselves in overlapping shingle-like arrangement, and adhesively applying continuous lengths of adhesive coated material to the folded back ears to adhesively bond said ears in said folded back, overlapping shingle-like arrangement.

7. A method of fabricating a new product from an unexpanded sheet of honeycomb of the type capable of being expanded into a honeycomb section comprising a plurality of strips of relatively flexible sheet material extending in a substantially common direction bonded to one another at spaced points throughout their respective lengths defining enlarged cell openings, and with portions of said strips projecting laterally outwardly to opposite sides of said sheet of cellular material defining laterally projecting, relatively flexible ears, comprising the steps: continuously expanding said unexpanded sheet of honeycomb in a direction substantially normal to the direction in which the plurality of strips of relatively flexible sheet material extend; while expanding said honeycomb continuously folding adjacent projecting ears of said sheet of honeycomb back over themselves in overlapping shingle-like arrangement; and continuously adhesively securing said ears in folded back, overlapping shingle-like arrangement.

8. A method according to claim 7 and wherein the last named step of adhesively securing said ears in folded back, overlapping shingle-like arrangement comprises, more specifically, the step of adhesively applying continuous lengths of adhesive coated material to said folded back and overlapped ears.

References Cited in the file of this patent

UNITED STATES PATENTS

| | | |
|---|---|---|
| 1,869,584 | Reymond | Aug. 2, 1932 |
| 2,001,632 | Schlichting | May 14, 1935 |
| 2,674,295 | Steele et al. | Apr. 6, 1954 |